United States Patent
Cui et al.

(10) Patent No.: US 8,833,967 B2
(45) Date of Patent: *Sep. 16, 2014

(54) REDUCED HEIGHT ILLUMINATION ASSEMBLY FOR A SCANNER

(75) Inventors: Chengwu Cui, Lexington, KY (US); Joshua Tyler Strow, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 303 days.

This patent is subject to a terminal disclaimer.

(21) Appl. No.: 13/444,322

(22) Filed: Apr. 11, 2012

(65) Prior Publication Data

US 2013/0271975 A1    Oct. 17, 2013

(51) Int. Cl.
*F21V 7/04* (2006.01)
*F21V 7/20* (2006.01)

(52) U.S. Cl.
CPC .... *F21V 7/20* (2013.01); *F21V 7/04* (2013.01)
USPC ........... 362/232; 362/297; 362/285; 362/235; 362/633; 362/613; 362/341; 362/360; 362/253; 362/355; 358/474; 359/857

(58) Field of Classification Search
None
See application file for complete search history.

(56) References Cited

U.S. PATENT DOCUMENTS

| | | | |
|---|---|---|---|
| 6,191,872 B1* | 2/2001 | DeCaro et al. | 358/509 |
| 8,485,675 B2* | 7/2013 | Allen et al. | 359/850 |
| 8,610,969 B2* | 12/2013 | Allen et al. | 358/475 |
| 2010/0033704 A1* | 2/2010 | Shiraishi | 355/71 |
| 2012/0014106 A1* | 1/2012 | Kamijima | 362/293 |
| 2013/0243487 A1* | 9/2013 | Shinkawa | 399/221 |
| 2013/0308339 A1* | 11/2013 | Woodgate et al. | 362/609 |

* cited by examiner

*Primary Examiner* — Ashok Patel
(74) *Attorney, Agent, or Firm* — John Victor Pezdek

(57) ABSTRACT

An illumination assembly for a scanner comprising a light source, a primary reflector and a secondary reflector. The primary reflector comprises a lower member and upper member spaced away from the lower member. The upper member has a heatsink for dissipating the heat of the light source. The light source is positioned between the lower and upper members and is attached to the upper member allowing for decreased vertical height for the illumination assembly.

22 Claims, 7 Drawing Sheets

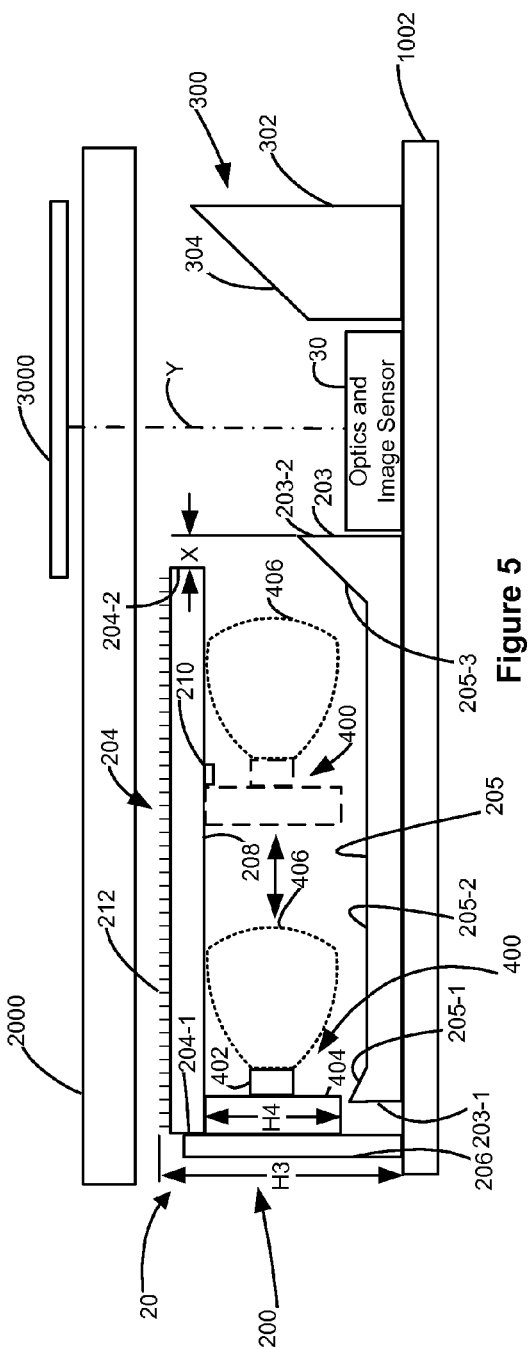
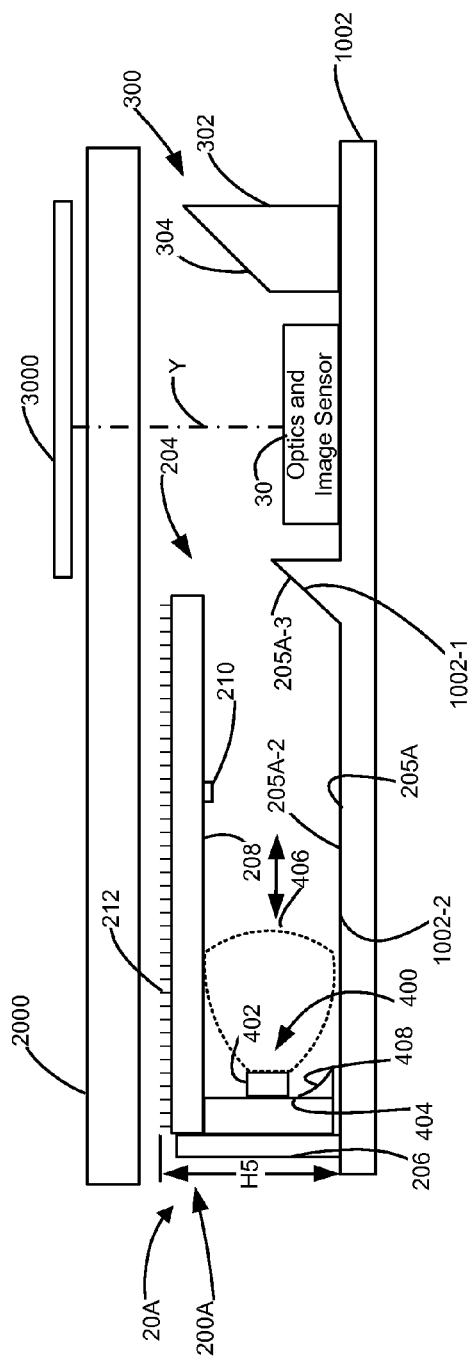
Figure 5
Figure 6

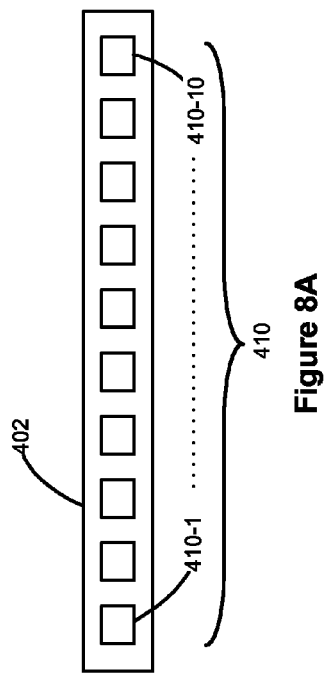
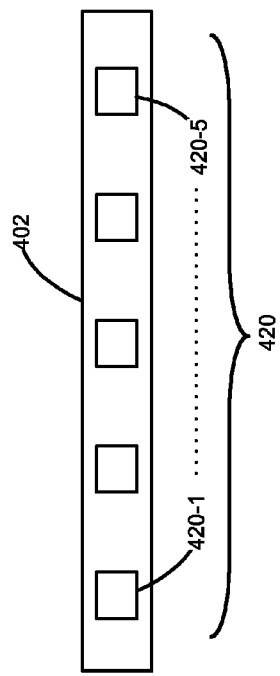
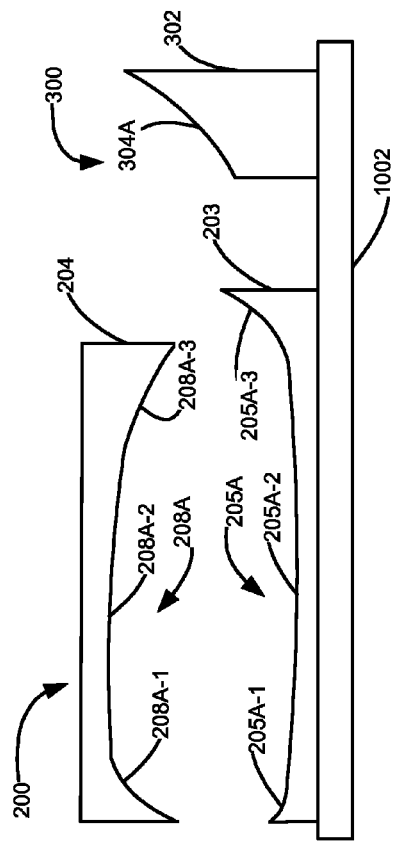
Figure 9
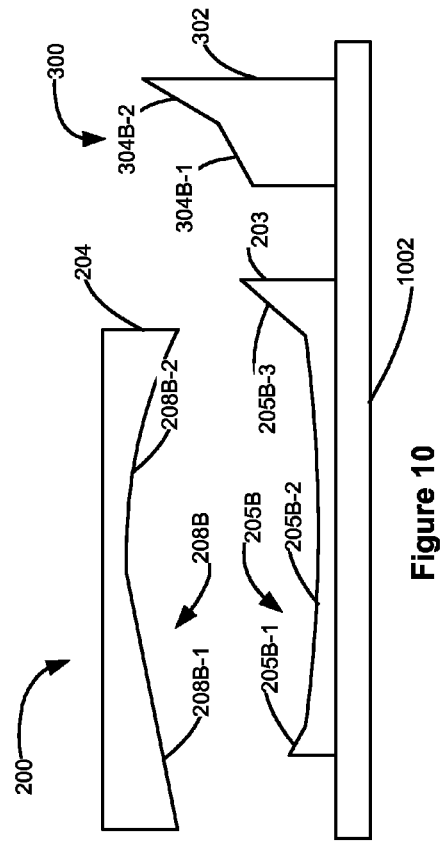
Figure 10
Figure 8A
Figure 8B

REDUCED HEIGHT ILLUMINATION ASSEMBLY FOR A SCANNER

CROSS REFERENCES TO RELATED APPLICATIONS

This application is related to U.S. Pat. No. 8,485,675, entitled "Illumination Assembly for a Scanner", issued Jul. 16, 2013, and U.S. Pat. No. 8,610,969, entitled "Illumination Assembly for a Scanner", issued Dec. 17, 2013, both assigned to the same assignee as the present application.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Disclosure

The present disclosure relates generally to scanners, and more specifically, to a reduced height illumination assembly for a scanner.

2. Description of the Related Art

High speed scanners typically require high intensity illumination. One example of a light source that provides the required illumination is an external electrode xenon fluorescent lamp. However, various problems are associated with the use of a xenon fluorescent lamp as a light source. For example, a high power xenon fluorescent lamp must be used to generate the required illumination. Such high power lamps may generate excessive heat. To address this issue, a cooling fan and a vent may be positioned on the scanner; however, this adds cost and acoustic noise and, in some cases, may result in potential contamination through the vent. Further, the high power xenon fluorescent lamp needs a high frequency and high voltage inverter, which further adversely impacts the scanner both in terms of safety and signal quality.

Recent technological developments in the field of scanners have provided another light source, white LEDs (light emitting diodes). In many cases, one high power LED may be used in conjunction with a light guide to generate the required illumination. Alternatively, an array of medium power LEDs may be used. The array of medium power LEDs generates more light and is desired for high speed scanners. However, it is desired to use as few LEDs as possible to reduce the cost of the device. The white LEDs may be generally blue LEDs that use a blue LED die with yellow phosphor to form white light. Light produced by such LEDs may not be sufficiently diffused or mixed and direct incidences of such light at a target area, such as a sheet to be scanned, is not desired.

Using an array of LEDs to provide illumination for document scanner has become popular. There are various ways to arrange the LEDs, collect light and direct them to the intended scan area. Each configuration usually balances uniformity, the degree of diffusion and efficiency and is achieved via optical simulation and empirical processes. Adequate intensity is needed to provide sufficient signal to noise ratio for the intended scan speed. Uniformity is needed to preserve the consistency of the noise to signal ratio across the page, and also adequate stability in the width direction of the illuminated area. Diffusion is needed to avoid dependence of scanned image to the reflective properties of the document surface. Under perfect diffuse illumination, the calibration strip would provide ideal calibration to the scan to produce scanned image free of artifacts of the illumination from the scanner. For example, if the calibration strip is of a matte property, it will reflect light in one way. If the calibration strip is glossy, the specular reflection may produce a mirrored image that overlaps on top of the document image. Such a defect may appear as a banding pattern consistent with the LED array pattern. Another common defect is the deviation of neutral tones from being truly neutral, which is important to adequate color quality. With diffuse illumination, a scanner tuned to one type of paper for an ideal grey tone, will render similar grey tones for other common media types. With imperfect diffuse illumination, different media types may show different color hues that deviate from neutral, which can be highly objectionable. Therefore when intensity and efficiency is not an issue, a more diffuse illumination is highly desired.

C-shaped illumination assemblies having a primary C-shaped reflector positioned directly in the light ray path of a LED array or light source that is aimed directly into the bight portion or central portion of the C along with a secondary reflector positioned opposite the open end of the C have been used to achieve a more diffuse illumination of a target area of a scanner. However such an arrangement increases the overall height of the primary reflector because the radius of curvature of the primary reflector is increased so that the light rays reflected by the primary reflector are not blocked by the LED array or light source and its mounting structure. Having a more compact illumination assembly would help to reduce the overall height of the scanner.

Another important aspect of when using LEDs or LED arrays is thermal management. Both light output and life of a LED die is dependent on its operating junction temperature. The LED die is the internal semiconductor junction of the LED. Maintaining the LED array light output stability during a scan job is important to maintaining the consistency of scan image quality. The LED array must also perform consistently over the life of the scanner which also requires that the LED die temperatures of the LEDs in the array do not exceed their rated temperature.

Because of the potential excessive heat generated during a scan from the illumination assembly, particularly when a number of sheets of media are being scanned via an automatic document feeder, the LED array is usually mounted onto a heatsink or its equivalent to keep the LED dies to a desirable temperature range. The heatsink, or its equivalent, perform best when its mass and surfaces are large and when it is ventilated well such as when it is exposed to open air. The C-shaped illumination assemblies of the prior art have the LED array printed circuit board attached to a heatsink that is positioned between the C-shaped reflector and the main optical frame of the scan head. Because the C-shaped reflector is easier and more cost effective to manufacture by plastic injection molding, the C-shaped reflector acts as a cover to hinder airflow to the heatsink and therefore decrease the efficiency of the heatsink. Although the C-shaped reflector can be made of metal, if cost is not an issue, doing so will increase the overall weight of the scan head assembly due to its substantially large volume which is a consideration in scanning systems where the scan head is moved during scanning.

Accordingly, it will be appreciated that a compact, efficiently heatsinked, and lower weight illumination assembly for a scanner that provides diffuse high intensity illumination in an efficient manner is desired.

SUMMARY OF THE DISCLOSURE

Disclosed herein is an illumination assembly for a scanner having a target area, comprising a scan head frame having a body portion for mounting the illumination assembly, a light source, a primary reflector mounted on the body portion and positioned on one side of the target area and a secondary reflector mounted on the body portion and positioned on the other side of the target area opposite the primary reflector and the light source, the secondary reflector having a reflective surface in the direct optical path of the light source. The primary reflector comprises a lower member positioned on the body portion of the scan head frame and an upper member depending from a support positioned on the scan head frame. The upper member has a heatsink and is spaced apart from the lower member. The light source is positioned between the upper and lower member and mounted to the upper member. A portion of a lower surface of the upper member and a portion of an upper surface of the lower member have reflective surfaces. The upper member has a length sufficient to block direct illumination of the target area by the light source. The reflective surfaces on the upper and lower members reflect a portion of the light rays emitted from the light source and direct it toward the one side of the target area and the reflective surface of the secondary reflector reflects a portion of the light rays emitted from the light source along the direct optical path to the other side of the target area.

The reflecting surfaces of the primary reflector may be a substantially single-faceted, curved surface. Alternatives include those wherein the reflecting surfaces of the primary reflector is a multi-faceted surface. In such alternatives, the upper and lower members of the primary reflector may each include a plurality of angularly oriented substantially straight sections. A reflecting surface of the secondary reflector may be curved or substantially planar.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings.

FIG. 5 is a diagrammatic side view of an illumination assembly illustrating translation of the light source within the illumination assembly.

FIG. 6 is a diagrammatic side view of an illumination assembly illustrating the lower member of the primary reflector being formed in the scan head frame.

FIGS. 8A, 8B illustrate various linear LED arrays for use in the illumination assembly of FIG. 3.

FIG. 9 is a side view of the reflectors for use in the illumination assembly of FIG. 3 illustrating curved reflective surfaces.

FIG. 10 is a side view of the reflectors for use in the illumination assembly of FIG. 3 illustrating combined planar and curved faceted reflective surfaces.

DETAILED DESCRIPTION

It is to be understood that various omissions and substitutions of equivalents are contemplated as circumstances may suggest or render expedient, but these are intended to cover the application or implementation without departing from the spirit or scope of the claims of the present disclosure. It is to be understood that the present disclosure is not limited in its application to the details of components set forth in the following description. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item. Furthermore, the terms "first," "second," and the like, herein do not denote any order, quantity, or importance, but rather are used to distinguish one element from another. Unless limited otherwise, the terms "coupled," and variations thereof herein are used broadly and encompass direct and indirect couplings. Moreover, the use of "coupled" and variations thereof herein does not denote a limitation to the arrangement of two components. The terms "upper" or "lower" are used to describe elements as shown in the accompanying Figures and not as terms of limitation.

The present disclosure provides a reduced height diffuse illumination assembly for a scanner. The illumination assembly provides diffuse high intensity illumination to be focused on a target area, such as a media sheet, to be scanned.

Figure 1:
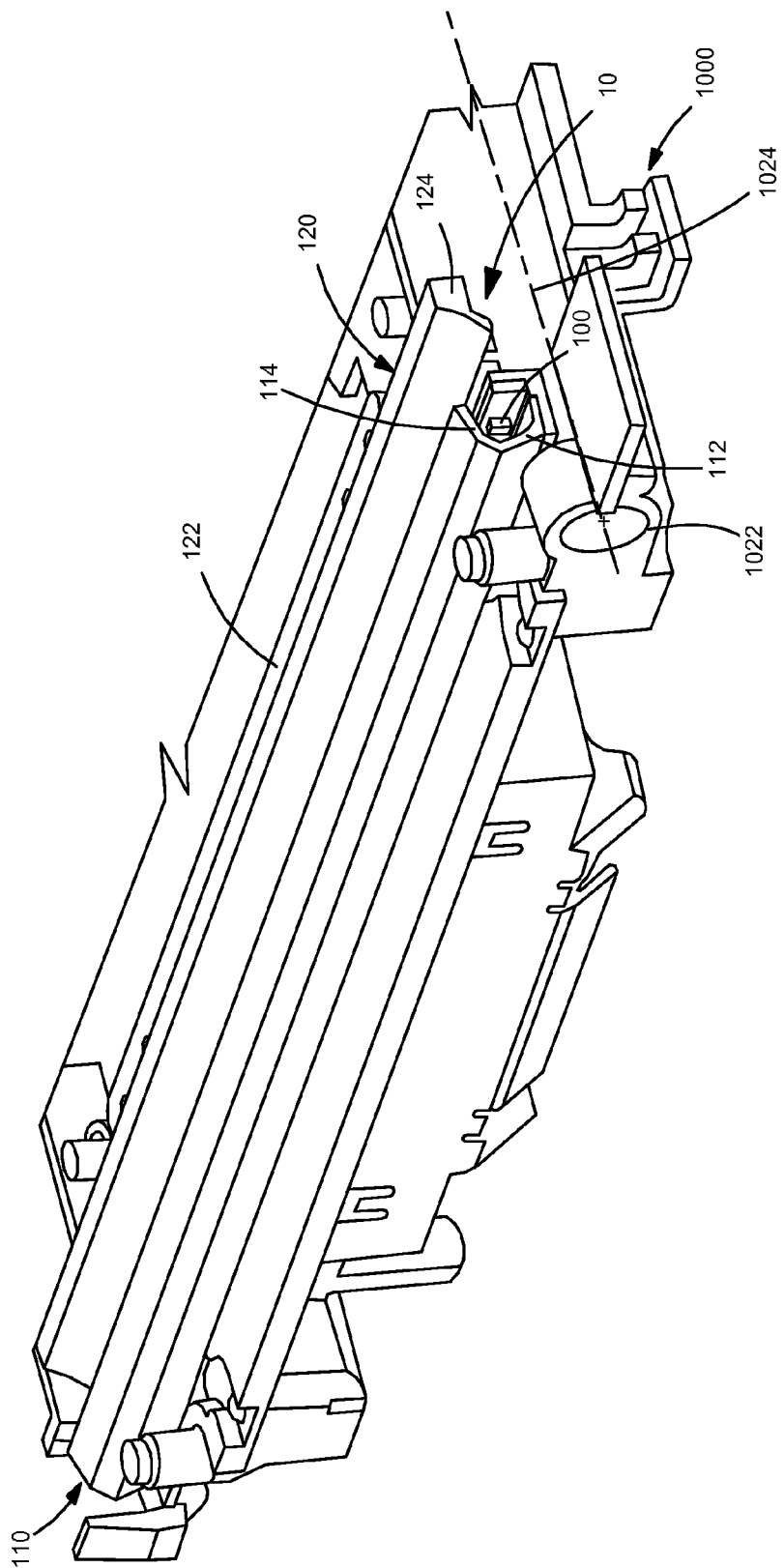
FIG. 1 is a perspective view depicting a prior art C-shaped illumination assembly positioned on a scan head frame of a scanner.
Figure 2:
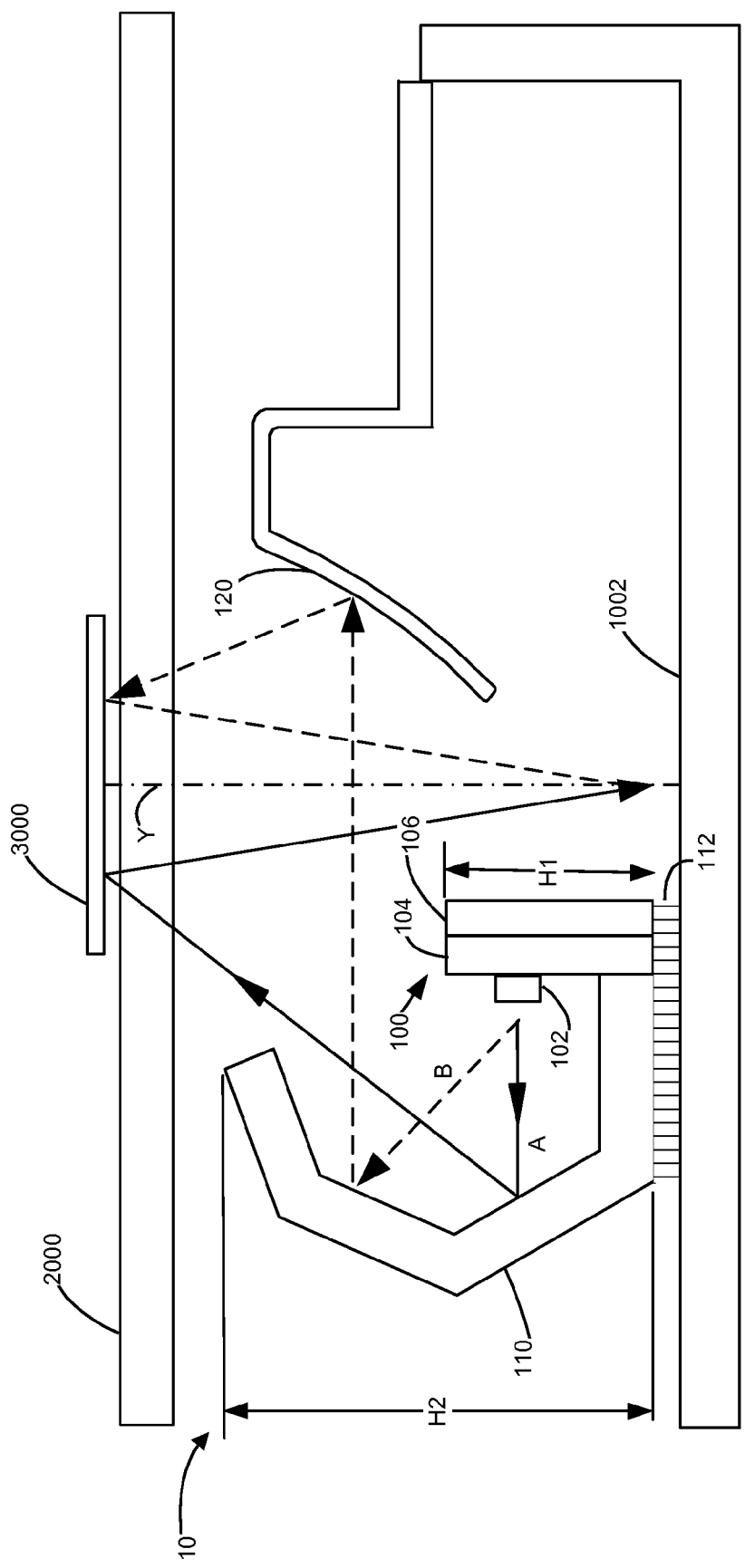
FIG. 2 is a side view of the prior art an illumination assembly of FIG. 1 illustrating various light ray paths.

Referring now to FIG. 1, a C-shaped prior art illumination assembly 10 is carried by a scan head frame 1000 of a scanner. Scan head frame 1000 is positioned under a platen glass 2000 of a scanner (FIG. 2). Illumination assembly 10 reciprocates back and forth under platen glass 2000 along with scan head frame 1000 which is driven by a driving mechanism (not shown) of the scanner. Scan head frame 1000 includes bushing 1022 aligned along bushing axis 1024 at a distal end of scan head frame 1000. Bushing 1022 receives a guide rod (not shown) to facilitate reciprocating back-and-forth movement of the scanner along the guide rod to permit the scanner to scan the entirety of an adjacent document positioned on the platen glass 2000. The scan head frame 1000 may also be mounted in a stationary manner such as along a media path of an automatic document feeder as is known in the art.

Referring to FIG. 2, prior art illumination assembly 10 includes a light source assembly 100, a primary reflector 110 and a secondary reflector 120, mounted on a body portion 1002 of scan head frame 1000. Primary reflector 110 is carried by body portion 1002 of scan head frame 1000 and positioned directly in the optical path of light source 100, as shown in FIG. 2. A heatsink 112 is disposed between primary reflector 100 and body portion 1002 of scan head frame 1000. The height H1 of light source assembly 100 that includes light source 102, circuit board 104 on which light source 102 is mounted and its support 106 is about 8 mm. Support 106 can be part of heatsink 112 or a separate element that is attached to heatsink 112 via a thermal conductive approach including but not limited to using thermal conductive adhesive. Because the light source 100 is positioned directly facing the central portion of primary reflector 110, its height H2 has to be greater than the height H1 of the light source assembly 100 so that the light rays are not substantially blocked by light source assembly 100. Height H2 is about 12.6 mm. The secondary reflector 120 is also raised above the top of light source assembly 100 in order to reflect light rays emitted from primary reflector 110 to a target area 3000 on platen glass 2000. However this arrangement does not provide for much adjustment in the degree of diffusion of the light.

Primary reflector 110 substantially encloses light source assembly 100 and defines a light path that may be defined as a path followed by light rays to reach the target area 3000 when light source assembly 100 emits light. Target area 3000 may be considered as an object, such as a media sheet, disposed on platen glass 2000 to be scanned.

Light source assembly 100 and primary reflector 110 are spaced vertically away from target area 3000 as indicated by axis 'Y.' As used herein, vertical direction Y is orthogonal to target area 3000 and therefore the term "vertical" is relative to the orientation of target area 3000. For example, target area 3000 may be disposed on a substantially horizontal flatbed portion of a conventional scanner such that vertical direction 'Y' is substantially vertical with respect to the ground. Where target area 3000 is disposed in an orientation other than horizontal such that vertical axis 'Y' is not vertical with respect to the ground. For example, target area 3000 may be positioned in an orientation other than horizontal in the body of an automatic document feeder as is known in the art. Axis Y also indicates the desired line about which the reflected light rays from the target area 3000 travel to the optics and image sensor of the scanner.

As shown in FIG. 2, a light ray A (shown with solid lines) emitted from light source 102 follows a first path for directly illuminating target area 3000. Light ray A is directly reflected by a lower portion of primary reflector 110 towards target area 3000 through platen glass 2000. It is to be understood that for purposes of clarity only a single light ray A is shown following the first path. However, a plurality of light rays, such as light ray A, may originate from light source assembly 100 and be reflected by the lower portion of primary reflector 110 towards target area 3000. Light ray A is further shown to reflect from target area 3000, such as the media to be scanned, to be captured by an image sensor (not shown). Once, light ray A reflects from target area 3000, light ray A may carry a particular amount of energy based on a transparency/opaqueness of target area 3000. The image sensor receives light ray A and converts the light energy carried by light ray A into a digital image of target area 3000.

FIG. 2 also shows a light ray B (shown by dashed lines) following a second path. Light ray B following the second path is reflected by an upper section primary reflector 110 to secondary reflector 120 then passing through platen glass 2000 then onto target area 3000. It is to be understood that for purposes of clarity only a single light ray B is shown following the second path. After light ray B is reflected from target area 3000 it reaches the image sensor. The image sensor will receive light ray B and convert a light energy carried by light ray B into a digital image of target area 3000.

Figure 3:
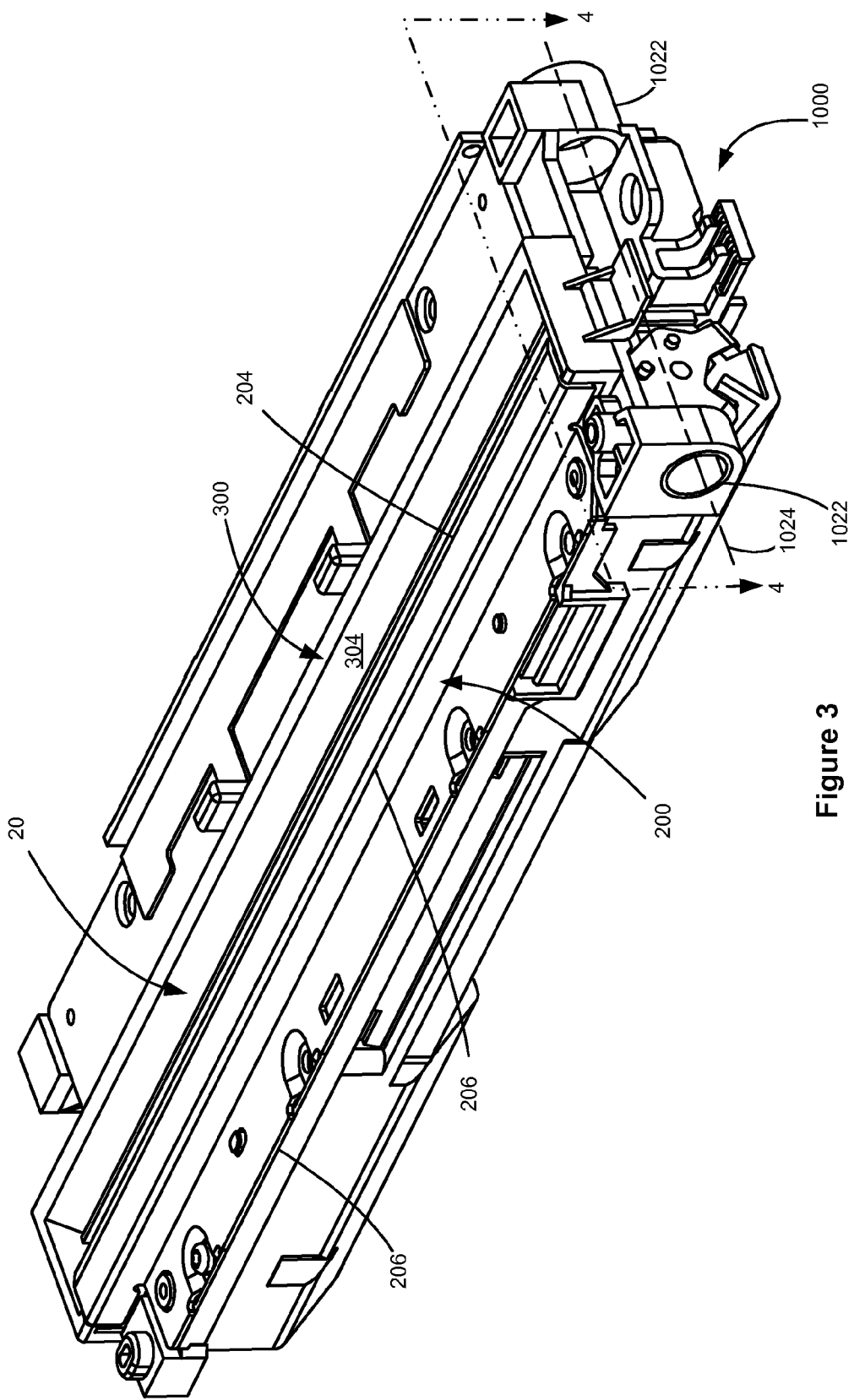
FIG. 3 is a perspective view depicting a reduced height illumination assembly of the present disclosure positioned on a scan head frame of a scanner.
Figure 4:
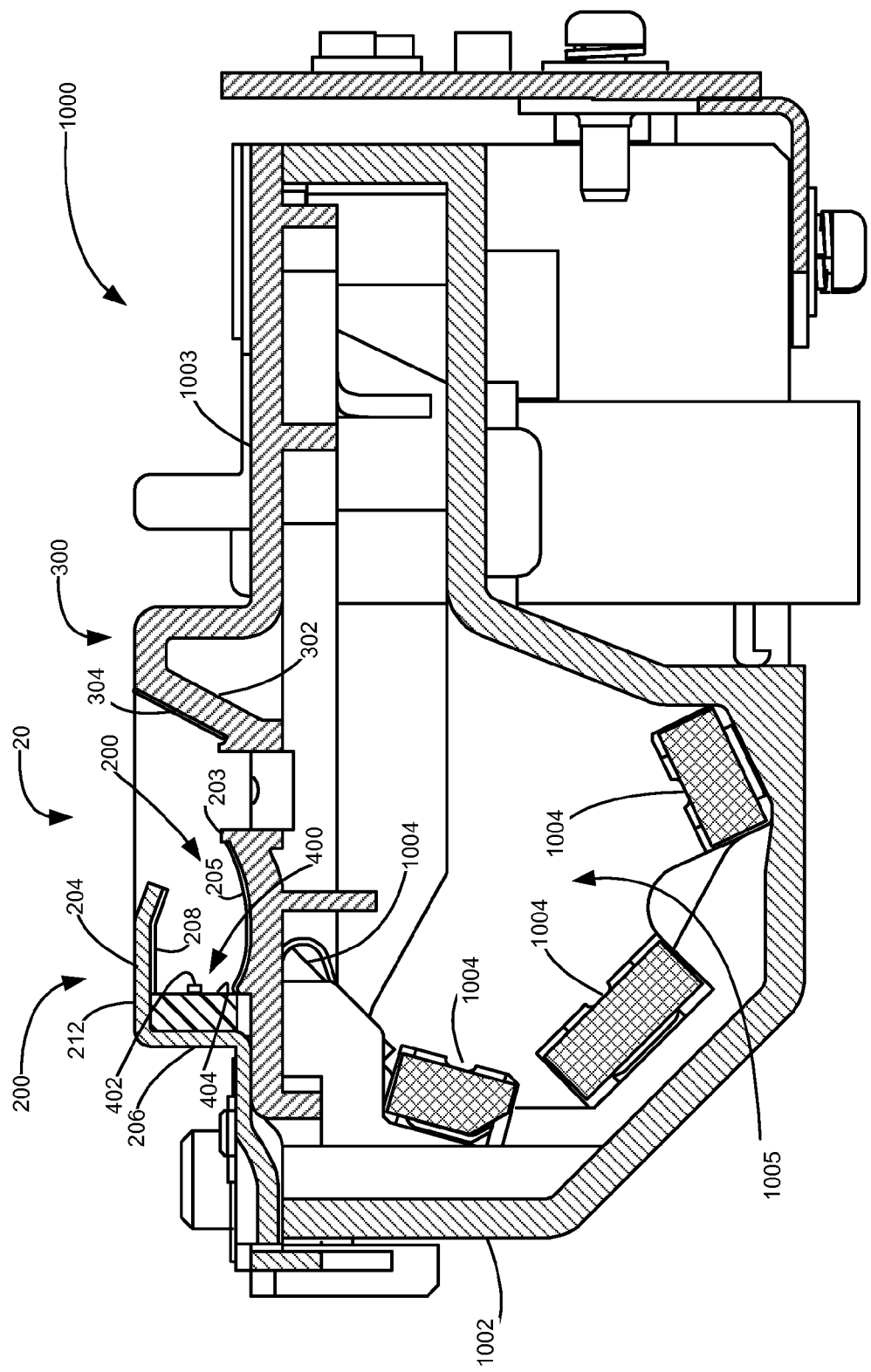
FIG. 4 is a sectional view of the illumination assembly of FIG. 3 taken along line 4-4.

Referring now to FIGS. 3 and 4, illumination assembly 20, including two piece primary reflector 200, secondary reflector 300 and light source assembly 400, has replaced prior art illumination assembly on scan head frame 1000 of a scanner. FIG. 4 is a sectional view of illumination assembly 20 taken along line 4-4 of FIG. 3. Scan head frame 1000 is positioned under a platen glass 2000 of a scanner (see FIG. 5). Illumination assembly 20 reciprocates back and forth under platen glass 2000 along with scan head frame 1000 which is driven by a driving mechanism (not shown) of the scanner. Scan head frame 1000 includes bushing 1022 aligned along bushing axis 1024 at a distal end of scan head frame 1000. Bushing 1022 receives a guide rod (not shown) to facilitate reciprocating back-and-forth movement of the scanner along the guide rod to permit the scanner to scan the entirety of an adjacent document positioned on the platen glass 2000. The scan head frame 1000 may also be mounted in a stationary manner such as along a media path of an automatic document feeder as is known in the art.

As viewed in FIG. 4, illumination assembly 20 is comprised of lower and upper members 203, 204, having reflective surfaces 205, 208, respectively. Scan head frame 1000 is shown comprised of body portion 1002 that includes cover 1003. Upper member 204 forms a heatsink 212 and is attached to support 206 that in turn is mounted to body portion 1002 and/or on cover 1003. Support 206 is illustrated as being generally L-shaped but other configurations for support 206 may be used and is a matter of design choice. Secondary reflector 300, comprised of support 302 and an angled reflector 304, is illustrated as formed in cover 1003 that is mounted in body portion 1002. A plurality of mirrors 1004 are provided within the interior 1005 of scan head frame 1000 for directing light rays reflected from target area 3000 to the image sensor (not shown in FIG. 4). Support 206 may comprise a single centrally located support or a plurality of spaced supports.

Figure 7:
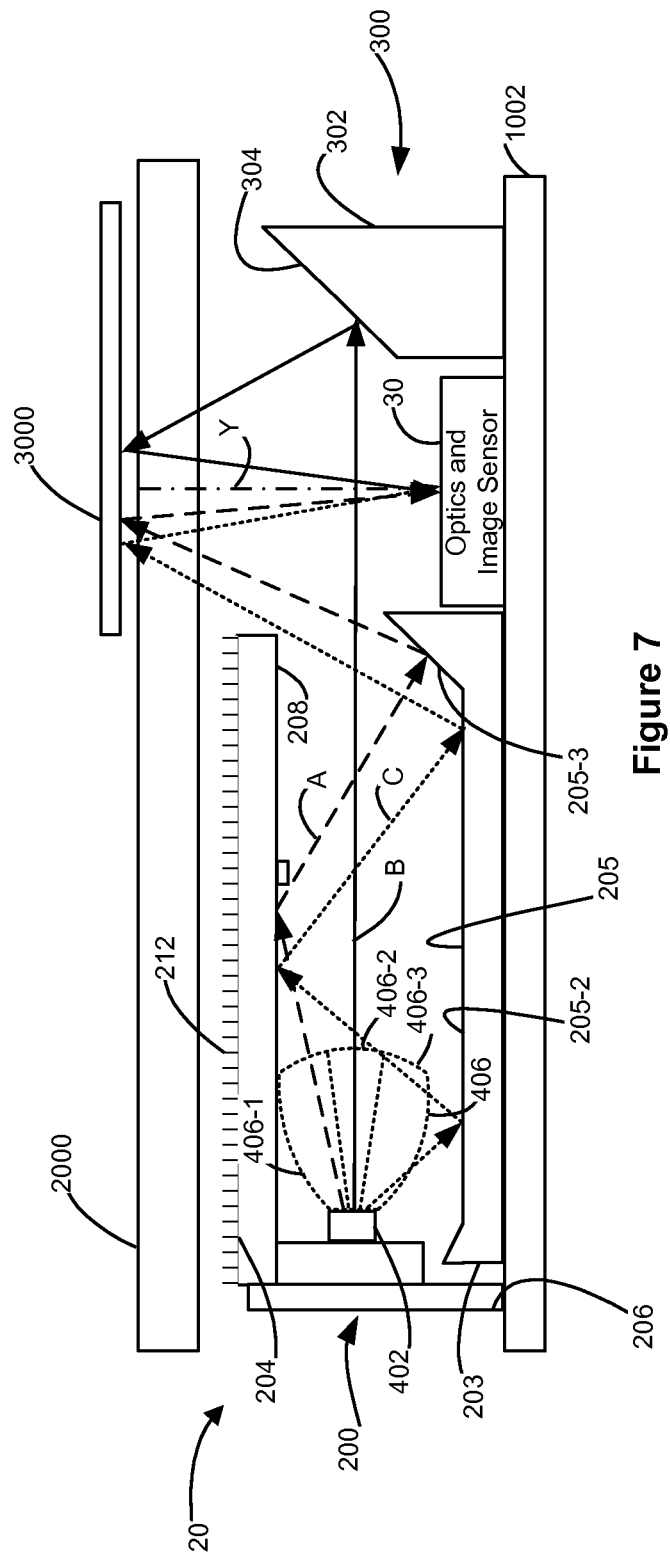
FIG. 7 is a diagrammatic side view of an illumination assembly illustrating various light ray paths from the upper peripheral region, the central region and the lower peripheral region of the light source distribution envelope.

Shown in FIGS. 5-7 is a diagrammatic depiction of illumination assembly 20 which has replaced illumination assembly 10 on scan head 1000. As described earlier, like light source 100 and primary reflector 110, illumination assembly 20 is spaced vertically away from target area 3000 as indicated by axis Y. Illumination assembly 20 comprises a two member primary reflector 200, having lower and upper members 203, 204, a secondary reflector 300, and a light source assembly 400 all of which extend along the width of scan head frame 1000 (into the page as viewed in FIGS. 6-7).

Light source assembly 400 is mounted in a moveably fixable manner on upper member 204 between the upper member 204 and lower member 203. During calibration of the scanner, the position of light source assembly 400 is movable relative to upper member 204 to adjust the light reaching target area 3000. When the desired illumination of target area 3000 is achieved, light source assembly 400 is then fixed in position on upper member 204. Hence, light source assembly 400 is referred to as being mounted in a moveably fixable manner. This mounting arrangement allows the overall height H3 of the illumination assembly 20 to be reduced in the vertical direction while still allowing the light 402 to directly illuminate secondary reflector 300. Example overall heights H3 for illumination assembly 20 are from 6 mm to 8 mm or about 33-58 percent shorter than the prior art illumination assembly 10. The manner of adjustable mounting used is a matter of design choice and may include tracks mounted on or guide recesses provided in upper member 204 or a series of aligned holes provided in upper member 204 for attaching light source assembly 400 by fasteners such as screws.

Light source 402 may be a xenon fluorescent tube light or may be a linear array of white LEDs extending across the width of the scan head frame 1000. For example, light source 402 may be blue LEDs coated with yellow phosphor to form white light. However, it will be appreciated by those skilled in the art that instead of utilizing an array of LEDs, a single high power white LED may be utilized as a light source. Moreover, instead of blue LEDs coated with yellow phosphor, a linear array of red, green and blue LEDs may be utilized as white LEDs.

The primary reflector 200 comprises a lower member 203, generally rectangular in shape, and an upper member 204, also generally rectangular in shape, mounted spaced apart from lower member 203. Upper member 204 is shown mounted in a cantilever manner from support 206 that is mounted on body portion 1002 of scan head frame 1000 and is substantially parallel to lower member 203. Lower member 203 is illustrated as being mounted on body portion 1002. Lower member 203 has a reflective surface 205 on its upper side. Upper member 204 has a reflective surface 208 on its lower side. As shown in FIGS. 5 and 6, reflective surface 208 is illustrated as being generally planar while reflective surface 205 is illustrated as being comprised of three generally planar facets, 205-1, 205-2, 205-3. Facet 205-1 is angled downwardly from the end of lower member 203 adjacent support 206 toward body portion 1002. Facet 205-3 is angled downwardly toward body portion 1002 from the other end of lower member 203 while facet 205-2 interconnects facets 205-1, 205-3. Facets 205-1, 205-3 may be angled between 0 to 90 degrees with respect to facet 205-2. Facet 205-3 helps direct the diffused light rays toward the target area 3000.

Secondary reflector 300 functions similar to secondary reflector 120 to provide light to the other side of the target area 3000. Secondary reflector 300 comprises a base 302 coupled to body portion 1002 of scan head frame 1000 and an angled reflective surface 304 that is angled to receive light rays from light source assembly 400 and reflect them to target area 3000. Fewer or additional facets or nonplanar facets may be provided in both reflective surfaces 205, 208, of lower and upper members 203, 205, respectively and reflective surface 304 as described in more detail with respect to FIGS. 8-9. In some embodiments, reflective surfaces 203, 205, 304 may be composed substantially of plastic, metal or glass.

Primary reflector 200 may be a diffuse reflector that is composed of a material, such as polycrystalline material, which with a matte finish exhibits diffuse reflection. Alternatively, primary reflector 200 may be a specular reflector that is composed of a material that exhibits specular reflection via a glossy finish. Moreover, primary reflector 200 may be a partial diffuse reflector or a partial specular reflector. Specifically, one of lower member 203 and upper member 204 may be a diffuse reflector and the other member may be a specular reflector or vice-versa. Therefore, lower member 203 and upper member 204 of primary reflector 200 may be adjusted to control the reflectance and spatial uniformity of primary reflector 200. Additionally, lower and upper members 203, 204 may each be colored to control the chromaticity of primary reflector 200. Lower and upper members 203, 204 may be colored with the same color or different colors to achieve a required chromaticity of primary reflector 200. Secondary reflector 300, particularly reflective surface 304 may be a diffuse reflector, a specular reflector or a combination of a diffuse reflector and a specular reflector. Moreover, reflective surface 304 may be colored with at least one color to achieve a required chromaticity.

The described characteristics of the reflective surfaces 205, 208 and 304 may be achieved by several approaches. In one approach, reflective surfaces 205, 208 and 304 may be an inherent property of the material used in upper member 204, lower member 203 and support 302, respectively, and the finishing technique used on that surface. Alternatively, in another approach a reflective surface may be sprayed or painted on upper member 204, lower member 203 and support 302. In a still further approach or an adhesive backed reflective film may be applied to upper member 204, lower member 203 and support 302. Lastly combinations of these approaches may be used. For example a reflective film is used for reflective surface 205, the material used in upper member 204 is ground to achieve a desired matte finish for reflective surface 208 and reflective surface 304 is painted on. Other combinations can be used as it is a matter of design choice of one of ordinary skill in the art.

Upper member 204 may be made of metal or plastic coupled with a heatsink to dissipate the heat generated by light source assembly 400. As shown in the example upper member 204, a heatsink 212 is provided on the upper surface of upper member 204. Heatsink 212 may be coupled to upper member 204, be integrally formed in upper member 204, or upper member 204 may be fabricated from a heatsink material and have reflective surface 208 applied as described above. This configuration of the heatsink 212 enables better air flow around the heatsink allowing for a smaller size than those found with the prior art C-shaped reflector arrangements. The size of the heatsink is empirically determined based on factors that include the power and temperature rating of light source 402.

Lower member 203 may be made of metal or plastic. In one form lower member 203 may be molded as part of body portion 1002 of scan head frame 1000. FIG. 6 illustrates this arrangement. Illumination assembly 20A is moveably fixable as indicated by the double headed arrow and is substantially the same as illumination assembly 20 except that the lower member 203 of primary reflector 200 is formed as part of the body portion 1002 of scan head frame 1000. As shown there, a reflective surface 205A is provided on body portion 1002 which has an angled section 1002-1 having a reflective surface 205A-3 which corresponds to facet 205-3 and a section 1002-2 having a reflective surface 205A-2 which corresponds to facet 205-2. A reflective surface 408 may be provided on support 404 and would correspond to facet 205-1 of lower member 203. Reflective surface 408, and sections 1002-1, 1002-2 serve as the lower member for primary reflector 200A. Surface 408 and reflective surface 205A may have the same characteristics and be formed in this same manner as those described for reflective surfaces 205, 208, and 304. It will be appreciated that the height H5 of the illumination assembly 20A may be further reduced as compared to the height H3 of illumination assembly 20. Example heights H5 for illumination assembly 20A are about 5 mm to 7 mm. Should edge emitting LEDs be used in the LED array, height H3 may be as short as 3 mm.

Using simulation, the lengths of the lower and upper members 203, 204 are empirically determined so that lights rays reach the target location after multiple reflections. Some example lengths for lower member 203 are 10 mm to 20 mm and for upper member 204 between 8 mm to 18 mm. Relative to the target area 3000, upper member 204 has a distal end 204-1 (left end as viewed in FIG. 5) and a proximal end 204-2 (right end as viewed in FIG. 5); similarly for distal end 203-1 and proximal end 203-2 of lower member 203. The proximal end 204-2 of upper member 204 is inset by an amount X (see FIG. 5) from the proximal end 203-2 of lower member 203 to allow the light rays reflecting off of facet 205-3 to reach the target location 3000. The amount of offset X between proximal end 204-2 of the upper member 204 and the proximal end 203-2 of lower member 203 or between the tip of segment 1002-2 and the proximal end of 204-2 upper member 204 is in the range of about 2 mm. The respective distal ends 203-1, 204-1 of lower and upper members 203, 204 may be aligned or distal end 203-1 may be inset from distal end 204-1.

The position of light source assembly 400 may be adjusted along a portion of the length of upper member 204. Light source assembly 400 is moveably fixable between the distal end 204-1 of the upper member 204 and the stop 210. Stop 210 is at a predetermined position that is spaced away from the proximal end 204-2 of the upper member 204. The portion of upper member 204 between the predetermined position and the proximal end is of a length to prevent direct illumination of target area 3000 by the light source 402. Stop 210 is placed so that the light wave distribution envelope 406 of light source 402 does not directly illuminate target area 3000. The position of light source 402 along upper member 204 is empirically determined taking into consideration the intensity of the light source and the shape and length of the lower and upper members 203, 204. This permits the degree of diffusion of the light source 402 to be adjusted and it also permits the use of a different type of light source or different numbers of the same type of light source to be used while still achieving the desired degree of diffusion. For example, for a light source 402 comprised of an array of many lower power LEDS, such as illustrated in FIG. 8A, the light source assembly may be placed adjacent stop 210 while a light source 402 comprised of an array of higher power and fewer LEDs, such as illustrated in FIG. 8B, may be placed adjacent the rear of upper member 204 near support 206, with each different array achieving substantially the same degree of diffusion. In the latter case, a cost savings can be achieved by using a light source having a few number of LEDs. It has been empirically determined that as the power of light source 402 increases, the position of the light source moves toward the distal end 204-1 of upper member 204 to ensure sufficient diffusion of the emitted light.

Also illustrated on body portion 1002 of scan head frame 1000 is a block 30 depicting optics and an image sensor. The optics being one or more lenses and mirrors used to focus the light rays reflected from the target area 3000 onto the image sensor for detection and subsequent processing of the information contained in the light rays received at the image sensor.

Light source 402 is provided with the electrical power for emitting light. The light emitted from light source 402 is reflected towards target area 3000 by primary reflector 200 and secondary reflector 300. In FIG. 7, three different light ray paths for the emitted light are traced. Light ray distribution envelope 406 is shown having three regions—upper peripheral region 406-1, central region 406-2, and lower peripheral region 406-3. Light ray A (shown by dashed line) is shown being emitted from upper peripheral region 406-1 (shown by dashed line), light ray B (shown by solid line) from central region 406-2, and light ray C (shown by dotted line) from lower peripheral region 406-3. Light ray A reflects off reflective surface 208 of upper member 204, then from facet 205-3 of lower member 203, through platen glass 2000 onto target area 3000. From there, it is reflected to the optics and image sensor 30. Light ray B emitted from central portion 406-2 travels essentially parallel to both lower and upper member 203, 204 of primary reflector 200 and reflects off reflective surface 304 of secondary reflector 300, through platen glass 2000 onto target area 3000. From there it is reflected to the optics and image sensor 30. Light ray C reflects off facet 205-2 of reflective surface 205 of lower member 203, then from reflective surface 208 of upper member 204, back to facet 205-2 of reflective surface 205 and then through platen glass 2000 onto target area 3000. From there it is reflected to the optics and image sensor 30. As will be appreciated, light rays emitted from upper and lower peripheral regions of light source 402, will undergo multiple reflections as they travel between lower and upper member 203, 204, achieving a high degree of diffusion. The facets or surfaces of the upper and lower members 204, 203 are placed so that light rays emitted from the upper and lower peripheral regions 406-1, 406-3, of light distribution envelope 406 tend to fall onto the optics and image sensor 30 along the Y axis. Similarly, the reflective surface 304 of secondary reflector 300 is placed so that light rays emitted from the central region 406-2 of light distribution envelope 406 also tend to reflect along Y axis onto optics and image sensor 30.

Once light rays A-C reflect from target area 3000, light rays A-C may carry a particular amount of energy based on a reflectance/transparency/opaqueness of target area 3000. The image sensor receives the light rays and converts the light energy carried by light rays into a digital image of target area 3000.

Additionally, lower member 203 and upper member 205 are separated such that a ratio of light rays reflected through the path A and path C has a desired value to satisfy a required illumination at target area 3000 such that shadows are not formed during scanning of target area 3000. Alternatively in some implementations, an imbalance of the two paths is desired to achieve shadows for some unique image processing purpose such as identifying the edge of a page. Therefore, the ratio of light rays following path A to the light rays following path C may be between about 2:3 and about 3:2 and, in some embodiments, may be about 1:1. Other ratios may also be used.

FIGS. 8A, 8B illustrate light source 402 as linear arrays of LEDs. In FIG. 7A, light source 402 includes a linear array 410 of smaller LEDs 410-1-410-10 having a lower light output per LED. The LED arrays are generally made to order using a desired LED. Examples of such an array may use an example LED such as part number LTW-M670ZVS manufactured by LiteOn Technology Corporation, 90 Chien I Road, Chung Ho, Taipei Hsien 235, Taiwan, R.O.C. In FIG. 8B, light source 402 includes a liner array 420 of larger LEDs 420-1-420-5 having a higher light output per LED. Examples of such an array may use an example LED such as part number DomilLED Multi DTW-EJG manufactured by Dominant Opto Technologies, Lot 6, Batu Berendam, FTZ Phase III, 75350 Melaka Malaysia.

FIGS. 9 and 10 illustrate various configurations of reflective surfaces used in primary reflector 200 and second reflector 300. In FIG. 9, upper member 204 has a curved reflective surface 208A having three facets 208A-1, 208A-2, 208A-3, from rear to front, each of a different curvature. Lower member 203 has a curved reflective surface 205A having three facets 205A-1, 205A-2, 205A-3, from distal end to proximal end each of a different curvature. Similarly, secondary reflector 300 is shown with a curved reflective surface 304A, such as a parabolic surface or a concave surface.

In FIG. 10, upper member 204 has a reflective surface 208B having two facets 208B-1, 208B-2, from rear to front, where facet 208B-1 is generally planar while facet 208B-2 is curved. Lower member 203 has a curved reflective surface 205B having three facets 205B-1, 205B-2, 205B-3, from rear to front, with facets 205B-1, 205-3 being generally planar and angled similarly to facets 205-1, 205-3, respectively while facet 205-2 is curved. The distal end of lower member 203 is also illustrated as being inset from the distal end of upper member 204. Here secondary reflector 300 is shown having a reflective surface 304B comprised of two angled generally planar facets, lower facet 304B-1, and upper facet 304B-2 where upper facet 304B-2 is more steeply angled than lower facet 304B-1. One of skill in the art would recognize that various other configurations of reflective surfaces, such as elliptical surfaces, convex surfaces, or surfaces of a freeform may be used in the illumination assembly 20.

It is to be understood that for purposes of clarity, only a single light ray A, B and C are shown following the different paths. However, many other paths may be traced depending on the angle at which a light ray is emitted from light source 402. Except for a small amount of light rays leaving from the sides of scan head frame 1000, the remainder of emitted light rays will be reflected at least once by either primary reflector 200 or secondary reflector 300 with greater than 30 percent being reflected multiple times between lower and upper members 203, 204 of primary reflector 200. Further light waves emitted from the upper and lower peripheral regions 406-1, 406-3 will mix with that emitted from central region 406-2 achieving a very high amount of mixing or diffusion as compared to the prior art illumination assembly 10.

It is to be understood that a position of light source 402 within primary reflector 200 and a distance between primary reflector 200 and secondary reflector 300 is adjusted in a manner such the first path, second path, and third paths, illustrated by light rays A, B, and C, efficiently guide (reflect) light rays towards target area 3000. Additionally, lower member 203 and upper member 204 are separated using empirical techniques such that a ratio of light rays reflected through the first path and the third paths has a desired value to satisfy a required illumination at target area 3000 such that shadows are not formed during scanning of target area 3000 except as previously described for use in edge detection.

An illumination assembly, such as illumination assembly 20 provides highly diffuse illumination in an efficient manner. For example, the illumination assembly may be easily mounted or configured on a scan head frame of a scanner with less structural complexities. Further, the illumination assembly may provide the high intensity with high diffusion illumination in a cost effective manner. Specifically, use of LEDs as light source and reflectors provide high intensity illumination in the cost effective manner as compared to a conventional light source, such as a xenon fluorescent lamp. Moreover, the illumination assembly improves a scanning quality of the scanner by providing a sufficiently diffused light, which is focused on an object such as a media sheet to be scanned.

The foregoing description of several embodiments of the present disclosure has been presented for purposes of illustration. It is not intended to be exhaustive or to limit the present disclosure to the precise forms disclosed, and obviously many modifications and variations are possible in light of the above teaching. It is intended that the scope of the present disclosure be defined by the claims appended hereto.

What is claimed is:

1. An illumination assembly for a scanner having a target area, comprising:
    a scan head frame having a body portion for mounting the illumination assembly;
    a light source;
    a primary reflector mounted on the body portion and positioned on one side of the target area;
    a secondary reflector mounted on the body portion and positioned on the other side of the target area opposite the primary reflector and the light source, the secondary reflector having a reflective surface in a direct optical path of the light source; and
    the primary reflector comprising:
        a lower member positioned on the body portion of the scan head frame;
        an upper member depending from a support positioned on the scan head frame, the upper member having a heatsink, and being spaced apart from the lower member with the light source positioned between the upper and lower member and mounted to the upper member;
        a portion of a lower surface of the upper member having a reflective surface and a portion of an upper surface of the lower member having a reflective surface; and
        at least the upper member having a length sufficient to block direct illumination of the target area by the light source;
    wherein the reflective surfaces on the upper and lower members reflect a portion of the light rays emitted from the light source and direct it toward the one side of the target area and the reflective surface of the secondary reflector reflects a portion of the light rays emitted from the light source along the direct optical path to the other side of the target area.

2. The illumination assembly of claim 1, wherein the upper member has a distal end and a proximal end relative to the target area and the light source is moveably fixable between the distal end of the upper member and a predetermined position that is spaced away from the proximal end of the upper member, the portion of the upper member between the predetermined position and the proximal end preventing direct illumination of the target area by the light source.

3. The illumination assembly of claim 1, wherein the upper and lower members of the primary reflector each have a generally planar shape.

4. The illumination assembly of claim 1 wherein the lower member is formed in the body portion of the scan head frame.

5. The illumination assembly of claim 1 wherein the upper member has a heatsink mounted on a portion of its upper surface.

6. The illumination assembly of claim 1 wherein the upper member is formed of metal.

7. The illumination assembly of claim 1 wherein the height of the illumination assembly is between 6 mm to 8 mm.

8. The illumination assembly of claim 1, wherein the reflective surface of the upper member is one of a substantially single-faceted, curved surface, a multi-faceted surface and a multi-faceted curved surface.

9. The illumination assembly of claim 1, wherein the reflective surface of the lower member is one of a substantially single-faceted, curved surface, a multi-faceted surface and a multi-faceted curved surface.

10. An illumination assembly positioned on a scan head frame of a scanner having a target area, comprising:
    a light source comprising a linear array of LEDs;
    a primary reflector mounted on the scan head frame and positioned on one side of the target area;
    a secondary reflector mounted on the scan head frame and positioned on the other side of the target area opposite the primary reflector and the light source, the secondary reflector having a reflective surface in a direct optical path of the light source; and
    the primary reflector comprising:
        a lower member positioned on the scan head frame;
        an upper member mounted on a support positioned on the scan head frame, the upper member spaced apart from the lower member with the light source positioned between the upper and lower member and moveably fixably mounted to the upper member, the upper member further having a heatsink;
        a portion of a lower surface of the upper member having a reflective surface and a portion of an upper surface of the lower member having a reflective surface;
        the upper member having a length sufficient to block direct illumination of the target area by the light source; and
        the lower member having an angled portion extending beyond a proximal end of the upper member relative to the target area with a corresponding portion of the reflective surface of the lower member being angled to direct the emitted light to one side of the target area;

wherein the reflective surfaces on the upper and lower members reflect a portion of the light rays emitted from the light source and direct it toward the one side of the target area and the reflective surface of the secondary reflector reflects a portion of the light rays emitted from the light source along the direct optical path to the other side of the target area.

11. The illumination assembly of claim 10, wherein the upper member further has a distal end relative to the target area and the light source is moveably fixably mounted between the distal end of the upper member and a predetermined position that is spaced away from the proximal end of the upper member, the portion of the upper member between the predetermined position and the proximal end preventing direct illumination of the target area by the light source.

12. The illumination assembly of claim 10, wherein the upper and lower members of the primary reflector each have a generally planar shape and are substantially parallel to one another.

13. The illumination assembly of claim 10 wherein the lower member is formed in the scan head frame.

14. The illumination assembly of claim 10 wherein the upper member has a heat sink mounted on a portion of its upper surface.

15. The illumination assembly of claim 10 wherein the upper member is formed of metal.

16. The illumination assembly of claim 10 wherein the height of the illumination assembly is between 6 mm to 8 mm.

17. The illumination assembly of claim 10 wherein the reflective surface of the upper member is one of a substantially single-faceted, curved surface, a multi-faceted surface and a multi-faceted curved surface.

18. The illumination assembly of claim 10, wherein a ratio of light reflected by the upper member of the primary reflector to light reflected by the lower member portion of the primary reflector is between about 2:3 and about 3:2.

19. The illumination assembly of claim 10, wherein a ratio of light reflected by the upper member of the primary reflector to light reflected by the lower member of the primary reflector is about 1:1.

20. The illumination assembly of claim 10, wherein the upper member and the lower member of the primary reflector are colored for controlling the chromaticity of the primary reflector.

21. The illumination assembly of claim 10, wherein the primary reflector and the secondary reflector are each at least one of a diffuse reflector and a specular reflector.

22. An illumination assembly positioned on a scan head frame of a scanner having a target area, comprising:
- a light source comprising a linear array of LEDs;
- a primary reflector mounted on the scan head frame and positioned on one side of the target area, the primary reflector having a height of 5 mm to 7 mm;
- a secondary reflector mounted on the body portion and positioned on the other side of the target area opposite the primary reflector and the light source, the secondary reflector having a reflective surface in a straight line optical path to the light source; and
- the primary reflector comprising:
  - a lower member positioned on the scan head frame;
  - an upper member depending from a support mounted on the scan head frame and formed of a heat conducting material, the upper member spaced apart from the lower member with the light source positioned between the upper and lower member and moveably fixably mounted to the upper member;
  - a portion of a lower surface of the upper member having a reflective surface and a portion of an upper surface of the lower member having a reflective surface, the reflective surface of the upper member and the reflective surface of the lower member being formed of a first piece and a second piece of adhesive backed film;
  - the upper member having a length sufficient to block direct illumination of the target area by the light source; and
  - the lower member having a proximal end extending beyond the proximal end of the upper member with a portion of the reflective surface of the lower member at its proximal end being angled to direct the emitted light to one side of the target area, the proximal ends of the upper member and lower member being relative to the target area;
- wherein the reflective surfaces on the upper and lower members reflect and diffuse a portion of the light rays emitted from the light source and direct it toward the one side of the target area and the reflective surface of the secondary reflector reflects a portion of the light rays emitted light along the straight line optical path to the other side of the target area.

* * * * *